United States Patent [19]
Delrue et al.

[11] Patent Number: 6,086,935
[45] Date of Patent: Jul. 11, 2000

[54] METHOD FOR THE REDUCTION OF MICROBIAL LEVEL IN CEREAL AND LEGUME PRODUCTS

[75] Inventors: Rita M. Delrue, Minnetonka; Phillip Lawrence Fischer, Minneapolis, both of Minn.; Robert M. Tineri, Greenville, Miss.

[73] Assignee: Cargill, Incorporated, Minneapolis, Minn.

[21] Appl. No.: 09/081,380

[22] Filed: May 19, 1998

[51] Int. Cl.⁷ ............................... A23B 9/00; A23L 3/00
[52] U.S. Cl. ...................... 426/511; 426/519; 426/521; 426/634
[58] Field of Search .................... 426/510, 511, 426/508, 519, 521, 634

[56] References Cited

U.S. PATENT DOCUMENTS

| | | | |
|---|---|---|---|
| Re. 31,513 | 1/1984 | Glen | 426/521 |
| 198,192 | 12/1877 | d'Heureuse . | |
| 1,010,202 | 11/1911 | Thomas . | |
| 1,574,210 | 2/1926 | Spaulding . | |
| 2,704,257 | 3/1955 | DeSollano et al. | 99/93 |
| 3,035,918 | 5/1962 | Sorgenti et al. | 99/1 |
| 3,159,493 | 12/1964 | Japikse et al. | 99/216 |
| 3,159,494 | 12/1964 | Lawrence et al. | 99/216 |
| 3,194,664 | 7/1965 | Eytinge | 99/80 |
| 3,212,904 | 10/1965 | Gould et al. | 99/93 |
| 3,368,902 | 2/1968 | Berg | 99/83 |
| 3,404,986 | 10/1968 | Wimmer et al. | 99/93 |
| 3,554,772 | 1/1971 | Hankinson et al. | 99/215 |
| 3,653,915 | 4/1972 | Rubio | 99/80 R |
| 3,655,385 | 4/1972 | Rubio | 99/80 R |
| 3,859,452 | 1/1975 | Mendoza | 426/375 |
| 4,255,459 | 3/1981 | Glen | 426/510 |
| 4,329,371 | 5/1982 | Hart | 426/375 |
| 4,543,263 | 9/1985 | Goldhahn | 426/520 |
| 4,547,383 | 10/1985 | Goldhahn | 426/524 |
| 4,555,409 | 11/1985 | Hart | 426/424 |
| 4,594,260 | 6/1986 | Vaqueiro et al. | 426/622 |
| 4,770,891 | 9/1988 | Willard | 426/559 |
| 4,844,933 | 7/1989 | Hsieh et al. | 426/521 |
| 4,844,937 | 7/1989 | Wilkinson et al. | 426/559 |
| 4,882,188 | 11/1989 | Sawada et al. | 426/438 |
| 4,985,269 | 1/1991 | Irvin et al. | 426/560 |
| 4,996,063 | 2/1991 | Inglett | 426/21 |
| 5,176,931 | 1/1993 | Herbster | 426/242 |
| 5,225,224 | 7/1993 | VanNortwick | 426/549 |
| 5,296,253 | 3/1994 | Lusas et al. | 426/629 |
| 5,532,013 | 7/1996 | Martinez-Bustos et al. | 426/496 |
| 5,558,886 | 9/1996 | Martinez-Bustos et al. | 425/376.1 |
| 5,558,898 | 9/1996 | Sunderland | 426/626 |
| 5,589,214 | 12/1996 | Palm | 426/506 |
| 5,637,342 | 6/1997 | Brooks et al. | 426/510 |
| 5,652,010 | 7/1997 | Gimmler et al. | 426/549 |
| 5,681,600 | 10/1997 | Antinone et al. | 426/74 |
| 5,700,505 | 12/1997 | Hurst | 426/312 |

FOREIGN PATENT DOCUMENTS

| | | |
|---|---|---|
| 196464 | 10/1986 | European Pat. Off. . |
| 269257 | 6/1988 | European Pat. Off. . |
| 2139872 | 11/1984 | United Kingdom . |
| WO 86/05956 | 10/1986 | WIPO . |

OTHER PUBLICATIONS

Casolari, "About Basic Parameters of Food Sterilization Technology," *Food MicroBiology*, 1994, 11. 75–84.

Akao et al., "Sterilization of Powdery Food by Superheated Steam," *Eng. and Food*, vol. 2, 1993, 595–600.

Baquir, "Sanitation of Cereal Grains," *Dissertation Abstracts*, Dec. 1977, vol. 38, No. 6.

Lawrence et al., "Fluidized Heating Process for Microbial Destruction in Wheat Flour," *Chemical Eng. Progress Symp Series*, No. 86, vol. 64, pp. 77–84.

Martinez et al., "Caracteristicas quimicas y usos de harina instantanea de maiz II.", *Archivos Latinoamericanos de Nutricion* 1993, 43, 316–320.

*Primary Examiner*—George C. Yeung
*Attorney, Agent, or Firm*—Fitch, Even, Tabin & Flannery

[57] ABSTRACT

A particulate food product is indirectly heated to at least about 170° after steam is directly injected onto the particulate food product to provide a moist environment and surface moisture on the particulate food product. The indirect heating is continued for a time and temperature to reduce the microbial contamination of the particulate cereal and/or legume products by an amount of at least log 2 without the loss of the functional properties.

22 Claims, 1 Drawing Sheet

METHOD FOR THE REDUCTION OF MICROBIAL LEVEL IN CEREAL AND LEGUME PRODUCTS

The present invention generally relates to a method to reduce the microbial level in particulate food products such as cereal products and legume products. More particularly, steam is directly injected onto the particulate food product to provide a moist environment and surface moisture on the particulate food product. After the particulate food has a surface moisture content it is indirectly heated for a time and temperature sufficient to reduce the microbial contamination of the particulate cereal and/or legume products without the loss of the functional properties of the food product.

BACKGROUND OF THE INVENTION

There is considerable commercial interest in reducing the microbial content of cereal grains, flours and grits made therefrom as well as legumes and uncooked particulate products made from legumes. Lower initial microbial count would prolong shelf life and generally provide a more wholesome food. Almost any foods can certainly be sterilized through heat treatment. That is part of a cooking process. What is important, however, to this invention and to any discussion of reducing the microbial count of foods prior to use, is to reduce the microbial count prior to cooking without substantially adversely affecting the performance characteristics of the food being treated. Moreover, it is important that the process to reduce microbial count of the particulate food be continuous and not require increased pressure or pressurized vessels.

SUMMARY OF THE INVENTION

The invention provides a continuous process or method of reducing the microbial level in a particulate food product. In one aspect, the invention provides a method for reducing the microbial level in (1) a cereal product which has been milled into a flour, (2) a full particulate cereal grain such a kernels of corn, wheat, barley, malt and grains of rice, or (3) broken cereal particulates such as grits, broken corn kernels and broken rice grains. In another aspect, the invention provides a method for reducing the microbial level in legumes such as soy beans, grits and flours as well as and peas (outside the pods) or peanuts.

The method of the invention is unique in that it is continuous, does not require increased pressures with sealed containers and indirectly heats the particulate food product shortly after and/or during the injection of steam directly onto the food product to increase the moisture level of the surface of the food particles. Care should be taken not to expose the food particulates to moisture prior to its indirect heating because the moisture will hydrate the particulate food below the surface of the food particles and then the steam and indirect heat will tend to cook the food product and reduce its functionality. Care also should be taken to inject substantially just steam and not steam with oxygen or some other inert gas because oxygen or another gas will tend to reduce the moisture level of the surface of the particles. It is this surface moisture coupled with indirect heating, however, which is important to reducing the microbial content of the food product without substantially adversely affecting the functionality of the food product. The method of the invention will reduce the microbial count of the particulate food by at least log 2, and in an important aspect by at least log 4. Indeed in many cases, the invention permits the reduction of a microbial count to levels which are currently undetectable. Moreover, the method of the invention is practiced without the necessity of pressurizing the heating vessel to pressures substantially above one atmosphere or atmospheric conditions.

The method includes continuously conveying the particulate food product through an elongated conduit without pressurizing the conduit. As the particulate product goes through the conduit, it has steam directly injected onto it and is indirectly heated. The important function of the steam is to provide an amount of surface moisture on the food particles which with the indirect heat will kill bacteria on the food. Just indirect heat without steam will not provide a sufficiently lethal atmosphere for the bacteria without having too much heat, such that the functionality of the food will be adversely affected. Conversely, just using steam to provide heat will merely "steam cook" the food. The heat source for the indirect heat coupled with the steam injection should have a temperature which is effective for indirectly heating the particulate food product to a temperature of at least about 170° F. The heat source should not heat the food through substantial direct contact with the food particles, but indirectly heat the particulate food such as by convection from the heat source to the particles. In an important aspect the conduit should have a heat source which is a jacket which substantially surrounds the conduit throughout its length where the jacket is heated such as by steam, oil, electrically or any other suitable means for heating. In another important aspect, the indirect heat source should have a temperature of from about 212° F. to about 370° F. The temperature of the heat source and time of exposure of the particulate food product to the heat source is a function of the sensitivity of the food to heating such that it does not lose any substantial functionality. The combination of the temperature of the heat source, steam injection, surface moisture and time of exposure of the particulate food to the indirect heat source, however, should be effective to heat the particulate food to at least 170° F. and reduce the microbial count the particulate food product being conveyed through the conduit by at least about log 2 when the particulate food is mixed and has steam injected to it as described below.

As the particulate food product is being conveyed through the elongated conduit and just after the injection of the steam or during the injection of steam into the particulate food product, the food product is indirectly heated. The steam injection is to raise the moisture level of the surface of the food particulates as they are conveyed through the conduit and being exposed to indirect heat. The steam is injected into the conduit in an amount which is effective for providing an atmosphere in the conduit with a relative humidity of at least about 80%. In an important aspect the steam is provided in an amount where the atmosphere in the conduit has a relative humidity of from about 80 to about 100%. The steam should have a temperature of at least 212° F., and in an important aspect, it is superheated to a temperature of from about 230° F. to about 330° F. The temperature of the steam should not exceed 370° F. because the steam may then reduce the functionality of the food product. Generally, if more than 5 weight percent of the starch in the particulate product is gelatinized, the functional properties of the product likely will be adversely affected. In the case of malt, not more than 5 percent of the enzyme activity should be adversely affected after the process of the invention. In the case of soy beans or products made therefrom, the protein dispersibility index should not be reduced more than about 5%. In the case of soybeans, the invention also may be used to deactivate some enzymes.

While the particulate food product is (1) being conveyed through the conduit, (2) is being directly exposed to steam and (3) is being exposed to the indirect heat, the particulate food product is mixed at a rate to insure that as many particles as possible are (a) heated to 170° F. and (b) have their surface moisture increased such that after exit from the conduit the microbial count of the particulate food product is reduced by at least log 2 without substantially affecting the functionality of the food product. In the invention, it is important that the food product not be substantially hydrated below its surface such that it will be "cooked" and have its functionality impaired. The indirect heat, the steam, the surface moisture on the particles and the time of exposure of the particulate food to the indirect heat and steam are all related such that they are effective to reduce the microbial content of the particulate food at least about log 2, and in an important aspect about log 4.

DETAILED DESCRIPTION OF THE INVENTION

Figure 1:
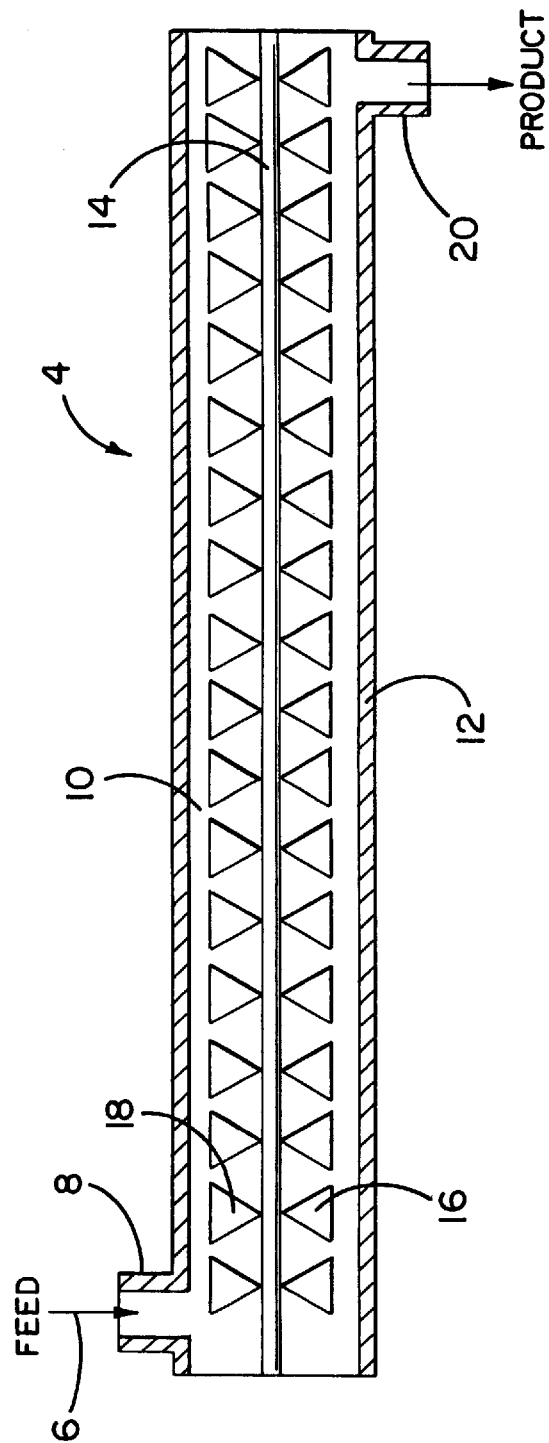
FIG. 1 is a schematic diagram of an apparatus which may be used to practice the invention.
Figure 2:
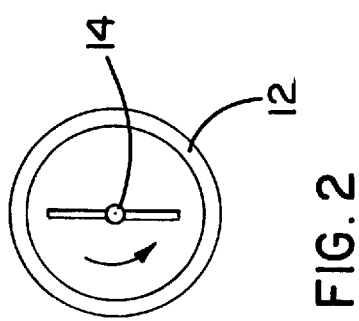
FIG. 2 is a side view of the apparatus of FIG. 1.

The to-be-treated product is fed into a elongated heating device 4 which is shown in FIG. 1. The particulate food product is fed into the heating device from hopper 6 through feed aperture 8 into channel 10. The particulate product is conveyed down channel 10 in the y direction. Channel 10 is surrounded by a steam jacket 12 through which steam is circulated. A hollow rod 14 extends longitudinally down the center of the channel. A plurality of paddles 16 are mounted on the rod 14 down its longitudinal length. The rod 14 is rotated and the paddles are angled such that as the rod rotates the paddles mix the particulate food product and push the product down channel 10. The paddles have openings 18 which from channels which extend through the paddles to the hollow center of rod 14. These openings are to transmit steam going through the rod and paddles so that the steam may be injected into the particulate food product being transmitted down channel 10. As the rod rotates the paddles push product down the conduit to exit aperture 20 through which treated particulate food product drops. The openings in the paddles may be opened or closed to control steam injection into the product being transmitted down the channel. In one aspect of the invention, some of the openings in the paddles towards the feed input end of the channel are open to transmit steam from the hollow rotating rod 14 into the particulate food product. Steam can be supplied through the rod and as such through the paddles into the to-be-treated particulate product. The amount of steam injected is effective for providing a moist environment having a relative humidity of at least 80% and also heats the product. Additional indirect heating of the particulate food is done by using indirect heat from the jacket of the device. Just enough steam is injected to provide moisture on the surface of the to be treated particles. With the moisture and heat from the steam and the indirect heat from the heat jacket heat source of the device, the conditions are sufficient to kill micro-organisms at the surface of the particulate food without substantially reducing the functionality of the food. The higher moisture content, the heat and the time of exposure of the food to the heat must be limited to prevent that the functional properties of the to-be-treated product is negatively influenced. A device which can be used to treat the particulate food as described herein is available as a Solidaire Model SJCS 8-4 from the Hosokawa Bepex Corporation, 333 N.E. Taft Street, Minneapolis, Minn. 55413.

The rotating paddles as vehicles for injecting steam, assure that the steam is uniformly distributed over the surfaces of the food product particles, but not into the particulate food. By choosing a specific length for the device, the indirect heating time of the product can be varied. It is important that the steam is injected at about the beginning of indirect heating in the device and that the rest of the time that the product is exposed to the indirect heat is used to kill the micro-organisms present and thereafter dry the product. It is important that there is sufficient mixing of the particulate product during the treatment that the surfaces of the food product are moist and achieve a temperature of at least about 170° F. The particulate product should not be exposed to indirect heating for more than about 3 minutes before cooking might take place and an adverse affect to the product. In an important aspect of the invention the product is not exposed to indirect heating for more than about 90 seconds, with about 60 seconds as a maximum being preferred.

The product after the steam and heat treatment can be cooled and dried (if necessary) using conventional techniques. Thereafter the product is packaged and may be packaged under aseptic conditions to keep the product from being recontaminated with micro-organisms.

Cereals, such as barley, malted barley, wheat, rye, rice can be treated but also a processed product from them, such as grits, meal, flour, brokens. In the conduit system described above with a conduit length of about seven feet, rice brokens and rice flour were heated to 180° F. for 54 to 60 seconds and conveyed through the conduit at a rate of from 200 to 1500 pounds of particulate food per hour with two paddles injecting steam. In this treatment, a reduction of the micro-organism count of at least about log 2 was obtained. In the conduit systems described above, with a conduit length of about seven feet, malt was heated to about 180° F. for 15 seconds at a rate of about 960 pounds per hour with three paddles open (rotating at 400 rpm). In this malt treatment, a reduction of the micro-organism count of at least about log 4 was obtained.

After the treatment, the product can be used as such for food applications or further processed, such as milling, breaking, sifting to obtain a specific granulation. The heat treatment as claimed above will provide a food-safe product related to microbial contaminations.

The following examples illustrate methods for carrying out the invention and should be understood to be illustrative of, but not limiting upon, the scope of the invention which is defined in the appended claims.

EXAMPLES

Example I

Treatment of Malt

A Solidaire Model SJCS 8-4 is used to treat malt at a rate of 960 pounds per hour using three paddles open for the injection of steam into the malt as it was being put into the conduit. The paddles were rotated at 400 rpm. with the time of exposure of the particulate food in the conduit varying from 10 to 15 seconds. Three runs were made where run 1 provided an exit product temperature of 194° F., had a jacket temperature of 222° F. and a steam temperature of 301° F., run 2 provided an exit product temperature of 194° F., had a jacket temperate of 280° F. and a steam temperature of 268° F., and run 3 provided an exit product temperature of 206° F., had a jacket temperate of 280° F. and a steam temperature of 275° F. The conditions for the three runs, the control and the reduction in microbial count are summarized in the Table I below.

TABLE I

3 Control Samples of Food Malt

|   | Log TPC/gr. | Log coliform MPN/gr. |
|---|---|---|
| A | 6.4 | 5.5 |
| B | 6.2 | 5.56 |
| C | 6.25 | 5.38 |

3 Treatments Food Malt

|   | Log TPC/gr. | Log coli | Exit Product Temp. (° F.) | Est. Retention Time (sec) | Jacket Temp. (° F.) | Steam Temp. (° F.) |
|---|---|---|---|---|---|---|
| 1 | 4.4 | 3.38 | 194 | 50.15 | 222 | 301 |
| 2 | 4.17 | 2.81 | 194 | 50.15 | 280 | 268 |
| 3 | 4.22 | 2.87 | 206 | 50.15 | 280 | 285 |

Example II
Treatment of Rice Brokens

A Solidaire Model SJCS 8-4 is used to treat rice brokens at a rate shown below using one or two paddles open for the injection of steam into the rice brokens as it was being put into the conduit. The paddles were rotated with the time of exposure of the particulate food in the conduit as shown in Table II below.

TABLE II

| Sample | TPC/g Log | Colif/g Log | Prod. Exit Temp. | Jacket Temp. | Direct Steam Temp. | Approx. Retention Time |
|---|---|---|---|---|---|---|
| 1 | 1.45 | 0.7 | 216 | 347 | 228 | 54 sec |
| 2 | 1.82 | 0.7 | 208 | 347 | 229 | 54 sec |
| 3 | 1.48 | 0.7 | 207.5 | 350 | 229 | 54 sec |
| 4 | 1.86 | 0.7 | 206.2 | 350 | 229 | 54 sec |
| 5 | 1.68 | 0.7 | 207 | 346 | 229 | 54 sec |
| 6 | 1.71 | 0.7 | 206.5 | 346 | 220 | 54 sec |
| Control 1 | 5.19 | 4.05 | | | | |
| Control 2 | 4.92 | 3.55 | | | | |
| Control 3 | 4.44 | 2.95 | | | | |
| Control 4 | 4.99 | 4.29 | | | | |
| Control 5 | 5.58 | 4.27 | | | | |

Example III
Treatment of Rice Flour

A Solidaire Model SJCS 8-4 is used to treat rice flour under the conditions described in Table III below.

TABLE III

| Time | 11.35 | 12.00 | 12.20 | 12.30 | 12.45 | 1.00 | blanc |
|---|---|---|---|---|---|---|---|
| Lb./Hr. | 1160 | 1160 | 1160 | 1160 | 1160 | 1160 | |
| # Paddles open to steam | 3 | 3 | 3 | 3 | 3 | 3 | |
| RPM Rotor | 600 | 600 | 600 | 600 | 600 | 600 | |
| Steam Jacket Temp (° F.) | 254 | 254 | 254 | 254 | 254 | 254 | |
| Direct Steam Temp. (° F.) | 250 | 270 | 265 | 264 | 264 | 263 | |
| PSI | 14 | 24 | 24 | 24 | 24 | 24 | |
| H20 Cooking | 11.62 | 13 | | 13.9 | 13.5 | 12.27 | |
| H20 Cooling | 11.31 | 12.28 | | 12.6 | 12.45 | 11.63 | 10.92 |
| # Code | | 1 | | 2 | | 3 | |
| Prod. Temp. | | 185 | 192 | 195 | 192 | 190 | |
| St. Dama | | 5.1 | | 3.9 | | 4.6 | |
| RVA 35% | | | | | | | |
| 1 Minute | | 347 | | 322 | | 337 | 328 |
| 10 Minute | | 312 | | 305 | | 312 | 272 |
| 12.5 Minute | | 275 | | 294 | | 290 | 260 |

| Time | 1.30 | 1.55 | 2.15 | 2.25 | 2.40 | 2.55 | blanc 2 |
|---|---|---|---|---|---|---|---|
| Lb./Hr. | 1160 | 1160 | 1160 | 1160 | 1160 | 1160 | |
| # Paddles open to steam | 3 | 3 | 3 | 3 | 3 | 3 | |
| RPM Rotor | 600 | 600 | 600 | 600 | 600 | 600 | |
| Steam Jacket | 254 | 254 | 254 | 254 | 254 | 254 | |
| Direct Steam | 250 | 250 | 250 | 250 | 250 | 250 | |
| PSI | 24 | 24 | 24 | 22 | 22 | 22 | |
| H20 Cooking | 13.7 | 13.7 | | 14.5 | 12.35 | 13.1 | |
| H20 Cooling | 12.4 | 12.4 | 12.9 | | | 12.6 | 9.92 |
| # Code | 4 | 5 | 6 | | | 7 | |
| Prod. Temp. | 195 | 199 | 199 | 199 | 200 | 208 | |
| St. Dam. | 3.6 | 3.9 | 5.1 | | | 3.08 | |
| RVA 35% | | | | | | | |
| 1 Minute | 328 | 328 | 327 | | | 321 | 376 |
| 10 Minute | 306 | 301 | 302 | | | 302 | 312 |
| 12.5 Minute | 282 | 293 | 292 | | | 290 | 294 |

| Time | 3.15 | 3.30 | 3.45 | 4.10 pm | 4.25 | 4.30 | blanc |
|---|---|---|---|---|---|---|---|
| Lb./Hr. | 1160 | 1160 | 1160 | 1740–1800 | 2000 | 2000 | |
| # Paddles Open to Steam | 3 | 3 | 3 | 3 | 3 | 3 | |
| RPM Rotor | 600 | 600 | 600 | 600 | 600 | 600 | |
| Steam Jacket Temp. ° F. | 254 | 254 | 254 | 254 | 254 | 254 | |
| Direct Steam Temp. ° F. | 256 | 256 | 256 | 261 | 270 | | |
| PSI | | 20.5 | 20 | 22 | 24 | | |
| H20 Cooking | 13.22 | 13.25 | 12.77 | 12.38 | 12.69 | | |
| H20 Cooling | 12.6 | 12.6 | 12.46 | 11.63 | 11.4 | | 11.39 |
| # Code | 8 | 9 | 10 | 11 | 12 | 13 | |
| Prod. Temp. | 200.3 | 203.5 | 205.5 | 187.7 | 175 | 182 | |
| St. Dam. | | | 5.7 | | 4.2 | | |
| RVA 35% | | | | | | | |
| 5 Minute | 337 | 276 | 311 | 350 | 350 | | 339 |
| 10 Min. | 310 | 259 | 288 | 302 | 279 | | 285 |
| 12.5 Min | 305 | 253 | 282 | 291 | 295 | | 265 |

| Sample (3/9/98) | TPC (cfu/g) | TPC (log cfu/g) | geom mean | Coliform | log cfu/g | geom mean |
|---|---|---|---|---|---|---|
| Control A-a | 6.7E + 04 | 4.83 | 4.84 | 4.4E + 03 | 3.64 | 3.70 |
| Control A-b | 7.2E + 04 | 4.86 | | 5.8E + 03 | 3.76 | |
| Control B-a | 5.5E + 04 | 4.74 | 4.76 | 6.9E + 03 | 3.84 | 3.83 |
| Control B-b | 6.0E + 04 | 4.78 | | 6.5E + 03 | 3.81 | |
| Control C-a | 3.1E + 04 | 4.49 | 4.62 | 5.1E + 03 | 3.71 | 3.75 |
| Control C-b | 5.5E + 04 | 4.74 | | 6.2E + 03 | 3.79 | |
| Control D-a | 3.2E + 04 | 4.51 | 4.40 | 1.6E + 03 | 3.20 | 3.40 |
| Control D-b | 2.0E + 04 | 4.30 | | 3.9E + 03 | 3.59 | |
| Control E-a | 1.7E + 04 | 4.23 | 4.19 | 1.3E + 03 | 3.11 | 3.21 |
| Control E-b | 1.4E + 04 | 4.15 | | 2.0E + 03 | 3.30 | |
| Flour 1Aa | 2.5E + 02 | 2.40 | 2.06 | 5.0E + 00 | 0.70 | 0.70 |
| Flour 1Ab | 2.0E + 02 | 2.30 | | 5.0E + 00 | 0.70 | |
| Flour 1Ba | 6.0E + 01 | 1.78 | | 5.0E + 00 | 0.70 | |
| Flour 1Bb | 6.0E + 01 | 1.78 | | 5.0E + 00 | 0.70 | |
| Flour 2Aa | 3.1E + 02 | 2.49 | 2.16 | 5.0E + 00 | 0.70 | 0.70 |
| Flour 2Ab | 2.5E + 02 | 2.40 | | 5.0E + 00 | 0.70 | |
| Flour 2Ba | 9.0E + 01 | 1.95 | | 5.0E + 00 | 0.70 | |
| Flour 2Bb | 6.0E + 01 | 1.78 | | 5.0E + 00 | 0.70 | |

TABLE III-continued

| | | | | | | |
|---|---|---|---|---|---|---|
| 3Aa | 9.0E + 01 | 1.95 | 2.07 | 5.0E + 00 | 0.70 | 0.70 |
| 3Ab | 1.3E + 02 | 2.11 | | 5.0E + 00 | 0.70 | |
| 3Ba | 1.5E + 02 | 2.18 | | 5.0E + 00 | 0.70 | |
| 3Bb | 1.1E + 02 | 2.04 | | 5.0E + 00 | 0.70 | |
| 4Aa | 5.0E + 01 | 1.70 | 1.70 | 5.0E + 00 | 0.70 | 0.70 |
| 4Ab | 6.0E + 01 | 1.78 | | 5.0E + 00 | 0.70 | |
| 4Ba | 3.0E + 01 | 1.48 | | 5.0E + 00 | 0.70 | |
| 4Bb | 7.0E + 01 | 1.85 | | 5.0E + 00 | 0.70 | |
| 5Aa | 1.4E + 02 | 2.15 | 1.90 | 5.0E + 00 | 0.70 | 0.70 |
| 5Ab | 8.0E + 01 | 1.90 | | 5.0E + 00 | 0.70 | |
| 5Ba | 7.0E + 01 | 1.85 | | 5.0E + 00 | 0.70 | |
| 5Bb | 5.0E + 01 | 1.70 | | 5.0E + 00 | 0.70 | |
| 6Aa | 7.0E + 01 | 1.85 | 1.90 | 5.0E + 00 | 0.70 | 0.70 |
| 6Ab | 4.0E + 01 | 1.60 | | 5.0E + 00 | 0.70 | |
| 6Ba | 1.0E + 02 | 2.00 | | 5.0E + 00 | 0.70 | |
| 6Bb | 1.4E + 02 | 2.15 | | 5.0E + 00 | 0.70 | |
| 7Aa | 7.0E + 01 | 1.85 | 1.75 | 5.0E + 00 | 0.70 | 0.70 |
| 7Ab | 2.0E + 02 | 2.30 | | 5.0E + 00 | 0.70 | |
| 7Ba | 7.0E + 01 | 1.85 | | 5.0E + 00 | 0.70 | |
| 7Bb | 1.0E + 01 | 1.00 | | 5.0E + 00 | 0.70 | |
| 8Aa | 9.0E + 01 | 1.95 | 1.89 | 5.0E + 00 | 0.70 | 0.70 |
| 8Ab | 1.0E + 02 | 2.00 | | 5.0E + 00 | 0.70 | |
| 8Ba | 8.0E + 01 | 1.90 | | 5.0E + 00 | 0.70 | |
| 8Bb | 5.0E + 01 | 1.70 | | 5.0E + 00 | 0.70 | |
| 9Aa | 1.0E + 02 | 2.00 | 1.96 | 5.0E + 00 | 0.70 | 0.70 |
| 9Ab | 5.0E + 01 | 1.70 | | 5.0E + 00 | 0.70 | |
| 9Ba | 1.1E + 02 | 2.04 | | 5.0E + 00 | 0.70 | |
| 9Bb | 1.3E + 02 | 2.11 | | 5.0E + 00 | 0.70 | |
| 10Aa | 9.0E + 01 | 1.95 | 2.44 | 5.0E + 00 | 0.70 | 0.70 |
| 10Ab | 1.2E + 02 | 2.08 | | 5.0E + 00 | 0.70 | |
| 10Ba | 7.4E + 02 | 2.87 | | 5.0E + 00 | 0.70 | |
| 10Bb | 7.3E + 02 | 2.86 | | 5.0E + 00 | 0.70 | |
| 11Aa | 1.5E + 03 | 3.18 | 2.97 | 1.0E + 01 | 1.00 | 0.85 |
| 11Ab | 1.8E + 03 | 3.26 | | 1.0E + 01 | 1.00 | |
| 11Ba | 5.0E + 02 | 2.70 | | 5.0E + 00 | 0.70 | |
| 11Bb | 5.8E + 02 | 2.76 | | 5.0E + 00 | 0.70 | |
| 12Aa | 5.7E + 03 | 3.76 | 3.57 | 1.2E + 02 | 2.08 | 1.77 |
| 12Ab | 5.4E + 03 | 3.73 | | 3.0E + 01 | 1.48 | |
| 12Ba | 2.6E + 03 | 3.41 | | 8.0E + 01 | 1.90 | |
| 12Bb | 2.4E + 03 | 3.38 | | 4.0E + 01 | 1.60 | |
| 13Aa | 1.0E + 03 | 3.00 | 3.44 | 2.0E + 01 | 1.30 | 1.96 |
| 13Ab | 1.1E + 03 | 3.04 | | 5.0E + 01 | 1.70 | |
| 13Ba | 7.6E + 03 | 3.88 | | 2.8 + 02 | 2.45 | |
| 13Bb | 7.0E + 03 | 3.85 | | 2.4E + 02 | 2.38 | |

Numerous modifications and variations in practice of the invention are expected to occur to those skilled in the art upon consideration of the foregoing detailed description of the invention. Consequently, such modifications and variations are intended to be included within the scope of the following claims.

What is claimed is:

1. A continuous process for reducing the microbial level in a particulate cereal or legume food product, the process comprising:

conveying the particulate food product through a conduit, the conduit having a temperature which is effective for indirectly heating the particulate food product to a temperature of at least about 170° F., the particulate food product being conveyed through the conduit at a rate which is effective for heating the particulate food product to a temperature of at least about 170° F. as the particulate food product exits the conduit;

injecting steam into the particulate food product as it is being conveyed through the conduit to provide a moisture content on the surface of the particles of food product, the steam being injected in an amount which is effective for providing an atmosphere in the conduit with a relative humidity of at least about 80%;

mixing the particulate food product as it is being exposed to the indirect heat, while the particulate food product is being conveyed through the conduit and while the steam is being injected into the particulate food product, the mixing being at a rate which is effective to increase the temperature of substantially of all of the particulate food product to at least 170° F. and the mixing being at a rate which is effective to increase the surface moisture of the particles of food, the indirect heat, the steam, the surface moisture on the particles and the particles having a time of exposure to the indirect heat and steam all of which are effective to reduce the microbial content of the particulate food at least about log 2, but not substantially adversely affect the functionality of the food.

2. The process as recited in claim 1 wherein the conduit has an indirect heat source which has a temperature of from about 212° F. to about 370° F.

3. The process as recited in claim 1 wherein the steam has a temperature of from about 212° F. to about 370° F.

4. The process as recited in claim 1 wherein the steam is injected into the conduit in an amount which is effective to provide a relative humidity of from about 80% to about 100%.

5. The process as recited in claim 1 wherein the conduit has an indirect heat source which has a temperature of from about 212° F. to about 370° F., the steam has a temperature of from about 212° F. to about 370° F., and the steam is injected into the conduit in an amount which is effective to provide a relative humidity of from about 80% to about 100%.

6. The process as recited in claim 1 wherein the indirect heating and the steam is injected into the conduit while maintaining the pressure in the conduit substantially at or below atmospheric conditions.

7. The process as recited in claim 5 wherein the indirect heating and the steam is injected into the conduit while maintaining the pressure in the conduit substantially at or below atmospheric conditions.

8. The process as recited in claim 1 wherein the steam injected into the conduit is substantially pure steam.

9. The process as recited in claim 5 wherein the steam injected into the conduit is substantially pure steam.

10. The process as recited in claim 1 wherein the steam is injected prior to or during the indirect heating of the particulate food product.

11. The process as recited in claim 5 wherein the steam is injected prior to or during the indirect heating of the particulate food product.

12. The process as recited in claim 1 wherein not more than 5 weight percent of starch in the food product is gelatinized during the process.

13. The process as recited in claim 5 wherein not more than 5 weight percent of starch in the food product is gelatinized during the process.

14. The process as recited in claim 1 wherein the particulate food product is selected from the group consisting of a cereal grain, broken cereal grains, a milled cereal product and mixtures thereof.

15. The process as recited in claim 5 wherein the particulate food product is selected from the group consisting of a cereal grain, broken cereal grains, a milled cereal product and mixtures thereof.

16. The process as recited in claim 4 wherein the particulate food product is selected from the group consisting of rice, broken rice grains, rice flour and mixtures thereof.

17. The process as recited in claim 13 wherein the particulate food product is selected from the group consisting of rice, broken rice grains, rice flour and mixtures thereof.

18. The process as recited in claim 14 wherein the particulate food product is malt and enzyme activity of the malt is not reduced more than about 5%.

19. The process as recited in claim 14 wherein the particulate food product is indirectly heated for not more than about 90 seconds.

20. The process as recited in claim 5 wherein the particulate food product is aseptically packaged.

21. The process as recited in claim 1 wherein the particulate food product is selected from the group consisting of soybeans and soy flour and a protein dispersibility index of the particulate food product is not reduced more than about 5%.

22. A continuous process for reducing the microbial level in a particulate cereal or legume food product, the process comprising:

conveying the particulate food product through a conduit, the conduit having a temperature which is effective for indirectly heating the particulate food product to a temperature of at least about 170° F., the particulate food product being conveyed through the conduit at a rate which is effective for heating the particulate food product to a temperature of at least about 170° F. as the particulate food product exits the conduit;

injecting steam into the particulate food product in an amount effective for raising the surface moisture content of the particulate food just prior to or during indirect heating, the steam being injected in an amount which is effective for providing an atmosphere in the conduit with a relative humidity of at least about 80% to about 100% without increasing pressure in the conduit substantially above atmospheric conditions;

mixing the particulate food product as it is being exposed to the indirect heat, while the particulate food product is being conveyed through the conduit and while the steam is being injected into the particulate food product, the mixing being at a rate which is effective to increase the temperature of substantially of all of the particulate food product to at least 170° F. and the mixing being at a rate which is effective to increase the surface moisture of the particles of food, the indirect heat, the steam, the surface moisture on the particles and the particles having a time of exposure to the indirect heat and steam all of which are effective to reduce the microbial content of the particulate food at least about log 2.

* * * * *